US008405235B2

(12) United States Patent  (10) Patent No.: US 8,405,235 B2
DiMauro et al.  (45) Date of Patent: Mar. 26, 2013

(54) ENERGY HARVESTING DEVICE

(75) Inventors: Sebastian Bruce DiMauro, Greer, SC (US); Alan C Lesesky, Charlotte, NC (US)

(73) Assignee: iEnergy Harvesting, Inc., Greer, SC (US)

( * ) Notice: Subject to any disclaimer, the term of this patent is extended or adjusted under 35 U.S.C. 154(b) by 401 days.

(21) Appl. No.: 12/800,185

(22) Filed: May 11, 2010

(65) Prior Publication Data

US 2010/0289271 A1  Nov. 18, 2010

Related U.S. Application Data

(60) Provisional application No. 61/177,789, filed on May 13, 2009.

(51) Int. Cl.
*H02K 35/04* (2006.01)
(52) U.S. Cl. ........................................................ 290/1 R
(58) Field of Classification Search .................. 290/1 R, 290/54; 310/67 A
See application file for complete search history.

(56) References Cited

U.S. PATENT DOCUMENTS

| | | | | |
|---|---|---|---|---|
| 3,604,965 A | * | 9/1971 | Stroud | 310/155 |
| 3,760,351 A | * | 9/1973 | Thomas | 340/443 |
| 4,163,904 A | * | 8/1979 | Skendrovic | 290/54 |
| 4,317,330 A | * | 3/1982 | Brankovics | 60/398 |
| 4,539,497 A | * | 9/1985 | Boyer | 310/75 R |
| 4,657,289 A | * | 4/1987 | Boyer | 290/1 R |
| 4,720,640 A | * | 1/1988 | Anderson et al. | 290/43 |
| 5,079,461 A | * | 1/1992 | Schluter et al. | 310/67 A |
| 5,268,602 A | * | 12/1993 | Schwaller | 310/67 A |
| 5,440,175 A | * | 8/1995 | Mayo et al. | 290/54 |
| 5,584,561 A | | 12/1996 | Lahos | |
| 5,818,132 A | * | 10/1998 | Konotchick | 310/17 |
| 6,037,690 A | | 3/2000 | Hill | |
| 6,474,832 B2 | | 11/2002 | Murray | |
| 6,550,945 B2 | | 4/2003 | Chiu | |
| 7,001,053 B1 | | 2/2006 | Chiah | |
| 7,275,844 B2 | | 10/2007 | Watanabe | |
| 7,466,049 B1 | | 12/2008 | Vancea | |
| 7,679,210 B2 | * | 3/2010 | Zhu | 290/55 |
| 7,679,249 B2 | * | 3/2010 | Appa et al. | 310/114 |
| 2011/0042957 A1 | * | 2/2011 | Drews | 290/54 |

FOREIGN PATENT DOCUMENTS

| | | | | |
|---|---|---|---|---|
| FR | 2413731 A | * | 8/1979 | |
| GB | 2283285 A | * | 5/1995 | |
| JP | 06311785 A | * | 11/1994 | |
| JP | 2000278923 A | * | 10/2000 | |
| JP | 15 2003-102154 A | | 4/2003 | |
| JP | 2003102154 A | * | 4/2003 | |
| JP | 16 2004-224069 A | | 8/2004 | |

(Continued)

OTHER PUBLICATIONS

International Searching Authority; International Search Report and Written Opinion of the International Searching Authority; International Application No. PCT/US2010/001414; Patent Cooperation Treaty; pp. 1-10; publisher Korean Intellectual Property Office; Published Seo-gu, Daejeon, Republic of Korea; copyright and mailing date Dec. 27, 2010; copy enclosed (10 pages).

*Primary Examiner* — Joseph Waks
(74) *Attorney, Agent, or Firm* — Metz Lewis Brodman Must O'Keefe

(57) ABSTRACT

An energy harvester is provided. The energy harvester includes a permanent magnet and a coil. At least one of the permanent magnet and coil rotate completely about an axis such that relative movement between the permanent magnet and the coil is realized to generate an electrical current for use in powering a device.

19 Claims, 11 Drawing Sheets

FOREIGN PATENT DOCUMENTS

| JP | 2004224069 | A | * | 8/2004 |
| KR | 20030023832 | A | * | 1/2003 |
| KR | 10-2003-0023832 | A | | 3/2003 |

* cited by examiner

ENERGY HARVESTING DEVICE

CROSS REFERENCE TO RELATED APPLICATIONS

This application claims the benefit of U.S. Application Ser. No. 61/177,789 filed on May 13, 2009 and entitled, "A circular energy harvesting device which captures rotational kinetic energy and produces electrical power that can be stored as potential energy." U.S. Application Ser. No. 61/177,789 is incorporated by reference herein in its entirety for all purposes.

FIELD OF THE INVENTION

The present invention relates generally to energy harvesters. More particularly, the present application involves energy harvesters that are capable of generating energy upon being driven by rotational kinetic forces, vibration forces, and/or fluid forces.

BACKGROUND

Electronic devices such as lights, vibration sensors, moisture sensors, pressure sensors, and electronic controls are commonly incorporated into various mechanical devices. For example, it is known to employ a pressure monitoring system with a vehicle tire for use in informing the driver of the vehicle of the status of the tire. Such pressure monitoring systems are generally affixed to the rim onto which the tire is seated and are powered by a battery. The life of the battery may be three or four years in length and generally coincides with the expected life of the tire so that the battery can be changed in the pressure monitoring system at the same time the tire is replaced. However, in longer life applications, such as when used on a tractor trailer tire, the battery in the pressure monitoring system may die before the tire is replaced. This situation requires the user perform a maintenance task of replacing the battery, or alternatively leaving the dead battery alone and foregoing the benefits of the use of the pressure monitoring system.

Mechanical devices often generate kinetic energy that is lost and never utilized. For example, vibrations imparted onto a vehicle or object during transport, rotational motion present in a rotating wheel of a vehicle, vibrations induced in a rotating shaft of a device, and water flowing through an irrigation system all represent kinetic energy that may be wasted. Capturing and utilizing this potentially wasted kinetic energy may provide a power source for devices associated with the object. Further, since the devices associated with the object may be driven without the use of conventional batteries, maintenance time and expense of replacing the batteries may be eliminated.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended Figs. in which.

Figure 1:
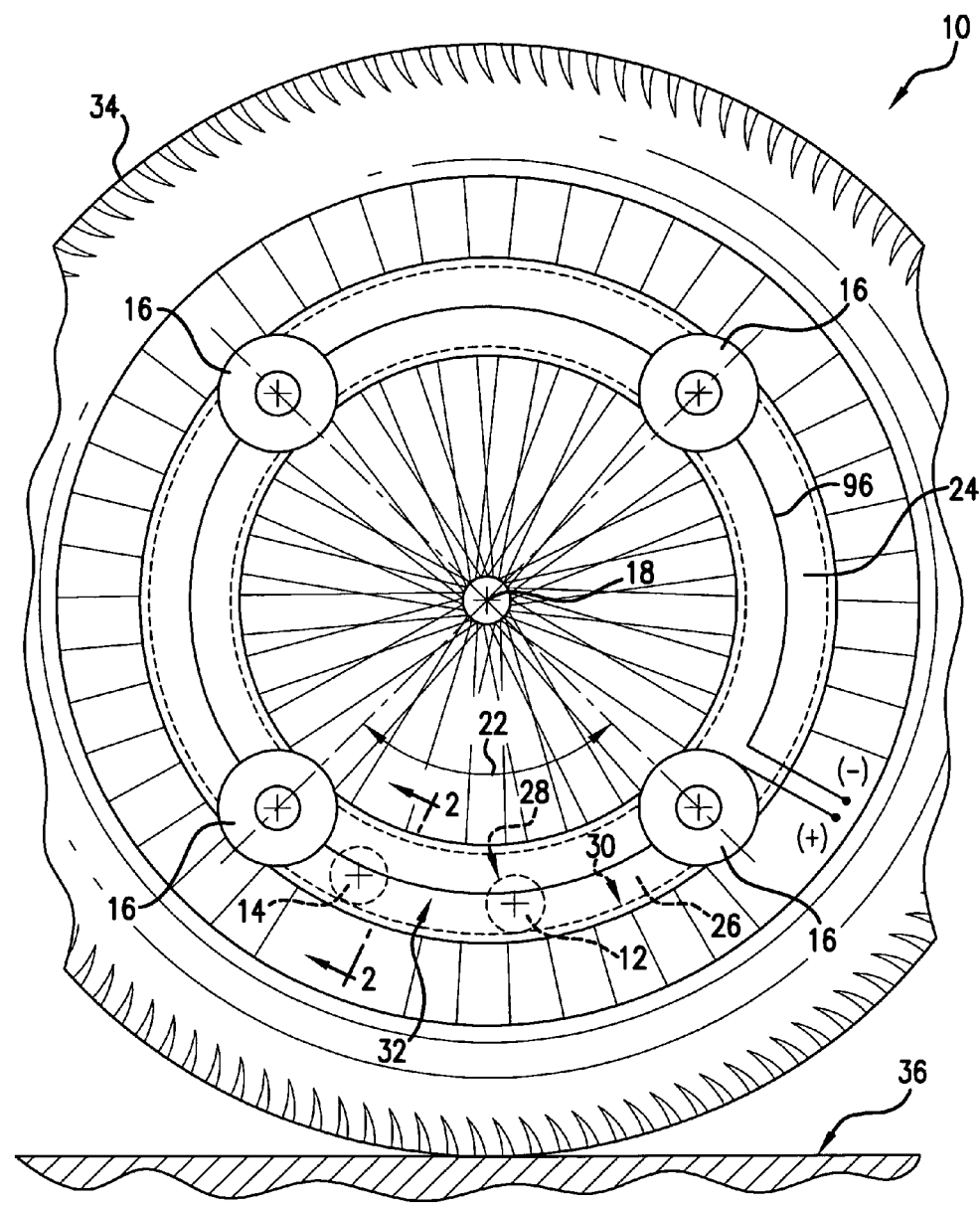
FIG. 1 is a front view of an energy harvester attached to a bicycle wheel in accordance with one exemplary embodiment.

Repeat use of reference characters in the present specification and drawings is intended to represent the same or analogous features or elements of the invention.

DETAILED DESCRIPTION OF REPRESENTATIVE EMBODIMENTS

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

It is to be understood that the ranges mentioned herein include all ranges located within the prescribed range. As such, all ranges mentioned herein include all sub-ranges included in the mentioned ranges. For instance, a range from 100-200 also includes ranges from 110-150, 170-190, and 153-162. Further, all limits mentioned herein include all other limits included in the mentioned limits. For instance, a limit of up to 7 also includes a limit of up to 5, up to 3, and up to 4.5.

The present invention provides for an energy harvester 10 capable of capturing energy to convert same for use in devices 20 such as lights, vibration monitors, moisture sensors, solenoid valves, and pressure monitors. The energy harvester 10 may be arranged so as to capture energy otherwise wasted in the normal functioning of objects to convert same for a useful purpose. For example, the energy harvester 10 can be incorporated into a bicycle wheel, rotating shaft, tractor trailer, rail way car, irrigation system, or automobile tire to capture wasted energy exerted by these objects and convert same for storage or for the direct driving of a device 20 associated with the object in question. In certain arrangements, the energy harvester 10 can capture rotational kinetic energy and produce electrical power for use in powering the device 20.

Figure 2:
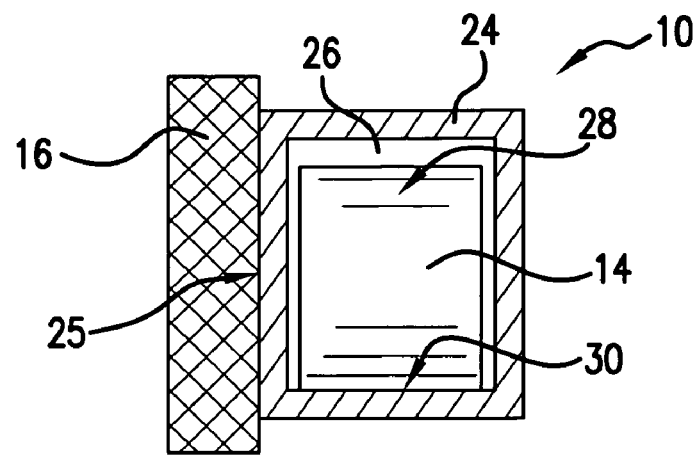
FIG. 2 is a cross-sectional view taken along line 2-2 of FIG. 1.

One exemplary embodiment of the energy harvester 10 is illustrated in FIGS. 1 and 2. Here, the energy harvester 10 is attached to a wheel of a bicycle 34 and functions as a safety light for the bicycle. The energy harvester 10 may be attached to the spokes of the wheel 34 and may rotate about an axis 18. The axis 18 can be coaxial with the rotational axis of the wheel 34 of the bicycle. The energy harvester 10 has a housing 24 that assumes a circular shape and extends 360° about the axis 18. The housing 24 extends a generally uniform distance in the radial direction and is spaced from the axis 18 so that an empty space is present at the center such that the axis 18 extends through the empty center of the energy harvester 10. The housing 24 may have any cross-sectional shape. In some arrangements, the housing 24 is made of a non-magnetic material.

A channel 26 is defined in the interior of the housing 24 and extends completely through the housing 24 so as to extend 360° about the axis 18. The channel 26 may have a uniform shape and may have a round or square cross-sectional shape in accordance with various embodiments. A permanent magnet 12 is located in the interior of the housing 24 and rides in the channel 26 defined in the interior. The permanent magnet 12 may be disc shaped and can have a curved outer surface 28 that engages the channel 26. In other arrangements, the permanent magnet 12 need not be disc shaped but can be variously formed. For example, the permanent magnet 12 may be square, triangular, rectangular, or spherical in accordance with other exemplary embodiments. Engagement between a concave bottom surface 30 of the channel 26 and the convex curved outer surface 28 causes the permanent magnet 12 to roll along the channel 26 as the housing 24, and hence channel 26, is rotated about the axis 18. The weight of the permanent magnet 12 may keep the permanent magnet 12 located at a bottom location 22 of the energy harvester 10. The bottom location 22 may be defined as a 90° arc length of the housing 24 that is the portion of the housing 24 located closest to the ground 36 when the axis 18 is oriented in a horizontal direction. In this regard, as the energy harvester 10 rotates, a different portion of the housing 24 will be located closest to the ground 36 due to the rotation. This new portion will then be at the bottom location 22. In other arrangements, the arc length defining the bottom location 22 may be 45°, 60°, 120°, or 180°. The permanent magnet 12 is located in the bottom location 22 the entire time as the housing 24 makes a complete rotation about the axis 18. The bottom location 22 is the bottom location of the energy harvester 10 which also includes the bottom location of the housing 24. The channel 26 may be completely surrounded by the housing 24 in certain embodiments. In yet other arrangements, the channel 26 is not completely encapsulated.

As such, during rotation of the housing 24, the permanent magnet 12 remains at the bottom location 22 and is prevented from being spun 360° about the axis 18 due to the weight of the permanent magnet 12 being pulled by gravity, and the curved/rotating engagement between the housing 24 and the permanent magnet 12. In certain exemplary embodiments, the permanent magnet 12 will remain in a relatively stationary position with respect to the axis 18. In other arrangements, the permanent magnet 12 may move some arc length about the axis 18 as the housing 24 rotates due to forces such as friction or the particular engagement between these components. For example, in some embodiments, the permanent magnet 12 may move within an arc length from 1°-5°, from 5°-10°, from 10°-20°, or up to 30° around the axis 18 during rotation of the housing 24.

The energy harvester 10 includes a coil 16 that is rigidly attached to the housing 24 so that the relative position between the coil 16 and the housing 24 does not change during use of the energy harvester 10. In accordance with one exemplary embodiment the coil 16 may have a helix cross-hatching design. Therefore, as the housing 24 rotates, the coil 16 rotates with the housing and hence moves past the permanent magnet 12 when the coil 16 moves through the bottom location 30 of the energy harvester 10. Relative movement between the permanent magnet 12 and the coil 16 induces an electrical current in the coil 16. This electrical current may be used to power a device 20 or can be stored for use in powering a device 20 in the future at a desired time or for powering the device 20 when the energy harvester 10 is not being rotated. Multiple coils 16 may be present in order to increase the amount of electrical current generated during a complete rotation of the housing 24. The coils 16 can be positioned symmetrically or asymmetrically about the housing 24. Further, any number of coils 16 can be used in other embodiments. For example, from 1-5 or up to 30 coils may be present in certain arrangements. The electric current generated in all of the coils 16 are transferred through a wire 96 to the device 20 that is to be powered. The wire 96 may be a single wire that is attached to all of the coils 16, or the wire 96 may comprise multiple wires extending from individual coils 16 that are not in electrical contact with one another.

Additional exemplary embodiments may make use of a second permanent magnet 14 arranged in a similar manner as the permanent magnet 12 that is disposed within the channel 26 in a likewise manner. The second permanent magnet 14 may function to increase the amount of electrical energy generated by the energy harvester 10 as the amount of magnetic field contact with the coils 16 is essentially doubled as the coils 16 move through the bottom location 22. The second permanent magnet 14 may also be located at the bottom location 22 the entire time as the housing 24 makes a complete 360° rotation about the axis 18. A spacer (not shown) can be present between the permanent magnets 12 and 14 in order to keep them from being attracted to one another and hence binding within the channel 26 and being unintentionally pulled 360° around the axis 18 during rotation of the housing 24. In other exemplary embodiments, the spacer is not needed. Here, the permanent magnets 12 and 14 may be arranged so that their polarities repel one another. As such, an empty space 32 is present between the permanent magnets 12 and 14 at all times. Although shown as employing two permanent magnets 12 and 14, it is to be understood that the energy harvester 10 may include any number of permanent magnets in accordance with other exemplary embodiments. Further, although described as rolling along the channel 26, it is to be understood that the permanent magnets 12 and 14 may slide or fall along the channel 26 in other arrangements and need not include a curved outer surface 28 for rolling.

Figure 3:
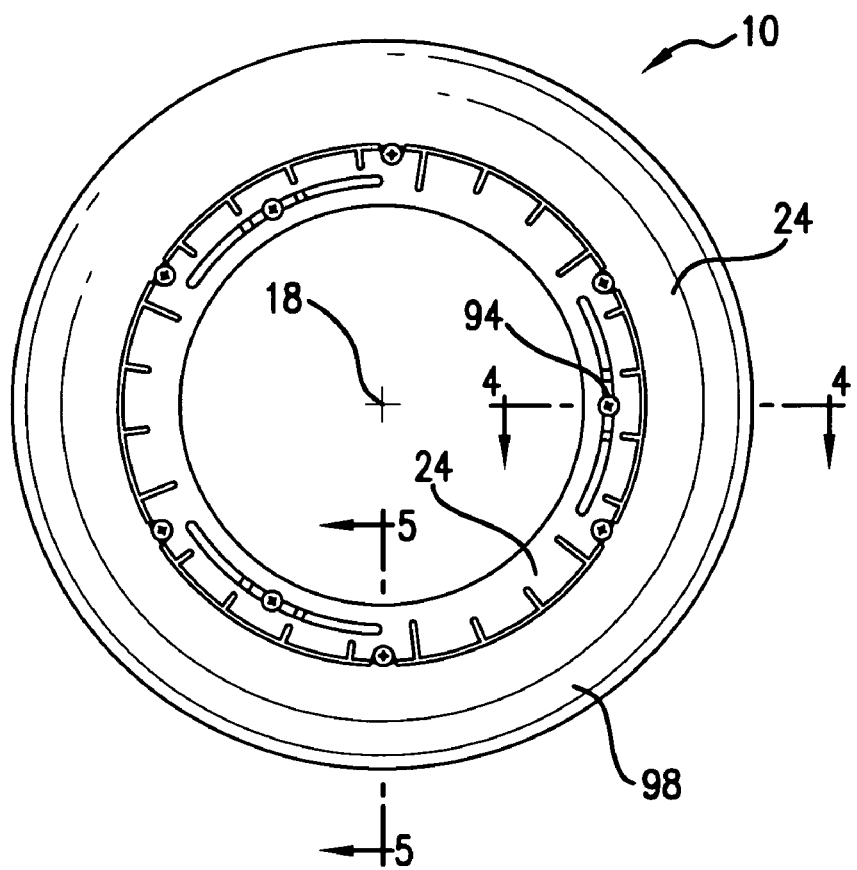
FIG. 3 is a front view of an energy harvester in accordance with another exemplary embodiment.
Figure 4:
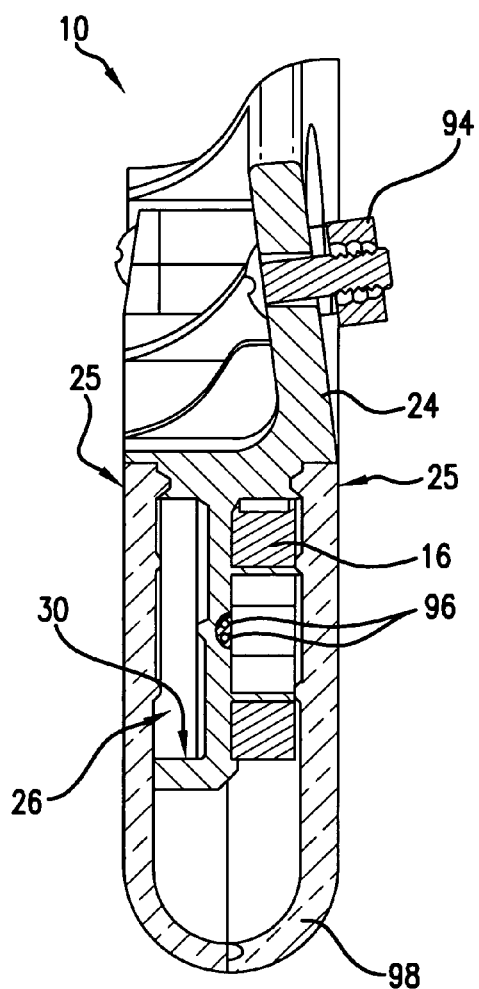
FIG. 4 is a cross-sectional view taken along line 4-4 of FIG. 3.
Figure 5:
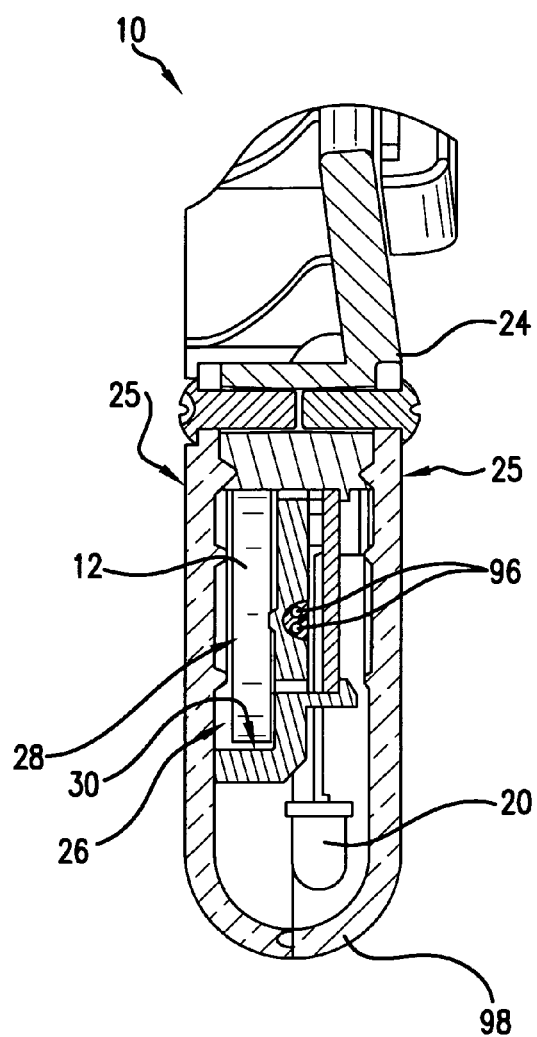
FIG. 5 is a cross-sectional view taken along line 5-5 of FIG. 3.

FIGS. 3-5 disclose an alternative exemplary embodiment of the energy harvester 10 that is similar to the one shown in FIGS. 1-2. A number of spoke clips 94 are present in order to effect attachment of the housing 24 to the spokes of the bicycle. The spoke clips 94 may be provided as any type of mechanical fastener to effect the desired attachment. Electrical current generated in the coils 16 is transferred to the device 20. In the illustrated embodiment, the device 20 is a light emitting diode that is illuminated through the generated power. The device 20 is encapsulated within the housing 24 which includes a lens 98 that functions to diffuse the light generated by the light emitting diode as desired. The device 20 may include any number of light emitting diodes disposed around the housing 24. For example, from 1-25 light emitting diodes may be present in accordance with various exemplary embodiments. Each coil 16 may be associated with a single light emitting diode for its power needs, or the coils 16 may all be in communication with one another so as to charge a battery of the device 20 or otherwise power all of the light emitting diodes present. The device 20 may include a battery that functions to store power generated by the relative displacement between the permanent magnet 12 and coil 16 so that the device 20 may still be powered even when the bicycle is stopped. Although described as being a light, the device 20 may be variously configured in accordance with other exemplary embodiments. For example, the device 20 may function to monitor tire pressure, to monitor vibration, to generate a radio frequency transmission, to monitor moisture, to effect a timer, or to provide any combination of the aforementioned functions.

Figure 6:
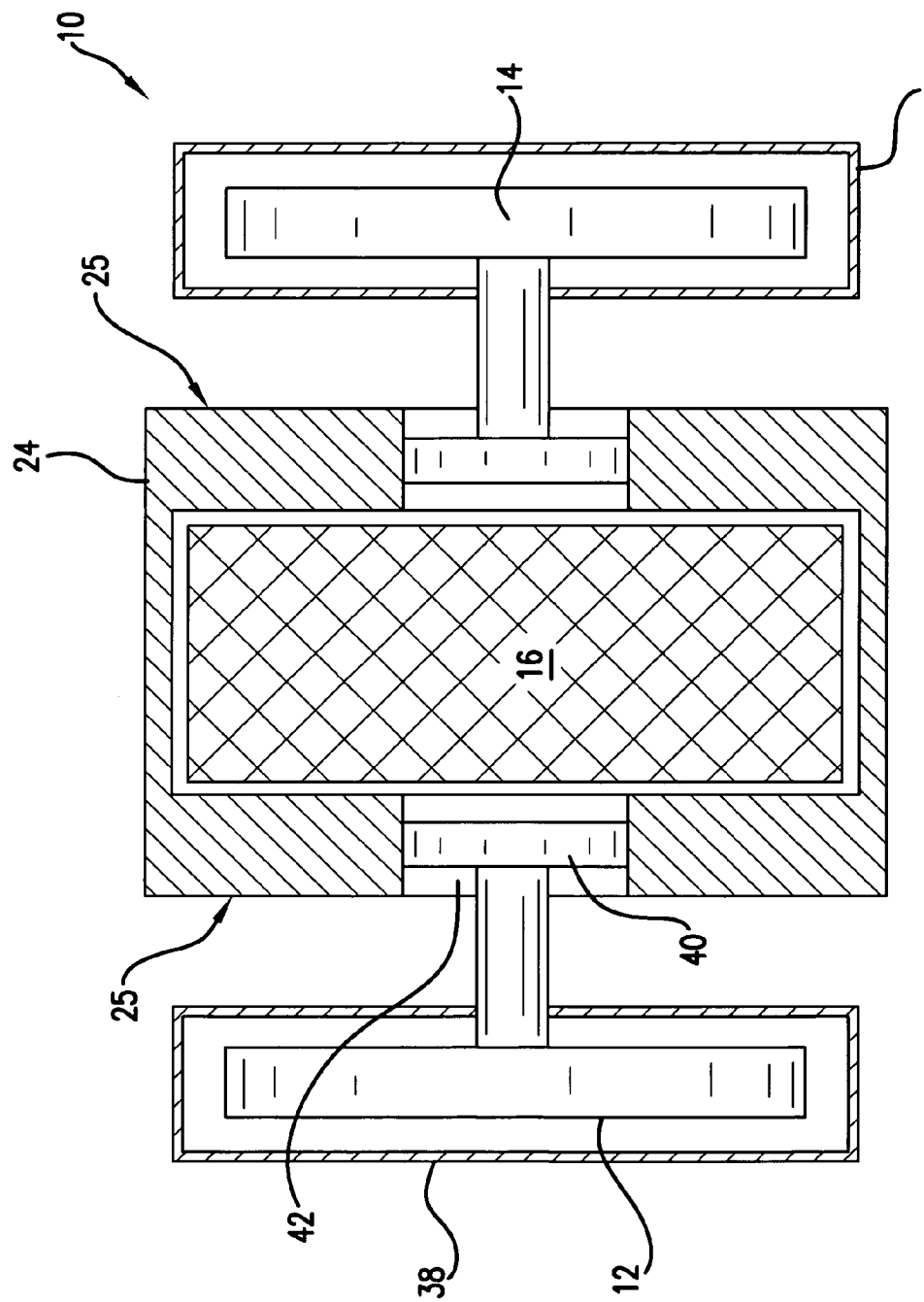
FIG. 6 is a cross-sectional view of an energy harvester in accordance with another exemplary embodiment.

Other exemplary embodiments are possible in which the permanent magnets 12 and 14 are not located within the housing 24. FIG. 6 shows one exemplary embodiment in which the permanent magnets 12 and 14 are carried by the housing 24 but are located beyond an outside surface 25 of the housing 24. The housing 24 includes an interior into which a plurality of coils 16 are disposed. The coils 16 may be rigidly attached to the housing 24 so that the relative positions of the coils 16 and the housing 24 do not change. A carriage 38 is attached to the housing 24 and is located beyond the outer surface 25 of the housing 24. Permanent magnet 12 is carried by the carriage 38 such that the relative position of the carriage 38 and the permanent magnet 12 does not change. The outside surface 25 of the housing 24 defines a slot 42 that is 360° around the housing 24 so as to extend 360° about the axis 18. One or more projections extend from the carriage 38 and include one or more rollers 40 on their ends that are located within the slot 42. The weight of the carriage 38 and the permanent magnet 12 causes these elements to remain at the bottom location 22 during rotation of the housing 24. As with the previously described embodiments, the permanent magnet 12 remains at the bottom location 22 and is not pulled around the axis 18 although it may shift back and forth some amount of arc length. The rollers 40 will roll through the entire length of the slot 42 during rotation so as to realize relative displacement between the permanent magnet 12 and the coil 16 as previously discussed. A second permanent magnet 14 may be located on the other side of the housing 24 from the permanent magnet 12 and can be affiliated with a second carriage 39 to increase the energy output of the system. The arrangement of the second carriage 39 may be the same as that of carriage 38 and a repeat of this information is not necessary.

The device 20 may include a microprocessor that is powered by the generated electricity. The microprocessor may function to regulate the generated power and any electronic circuitry that can sense, monitor and/or count the rotation of the energy harvester 10. Further, although described as being located within the housing 24, it is to be understood that the device 20 need not be located within the housing 24 in other arrangements. The device 20 may be located outside of the housing 24 and the wire 96 can be run to the device 20 in order to power same. The device 20 may be located on the same wheel 34 of the bicycle as the energy harvester 10, or the device 20 can be located at another portion of the bicycle and need not be on the same wheel 34 to which the energy harvester 10 is affixed.

Figure 7:
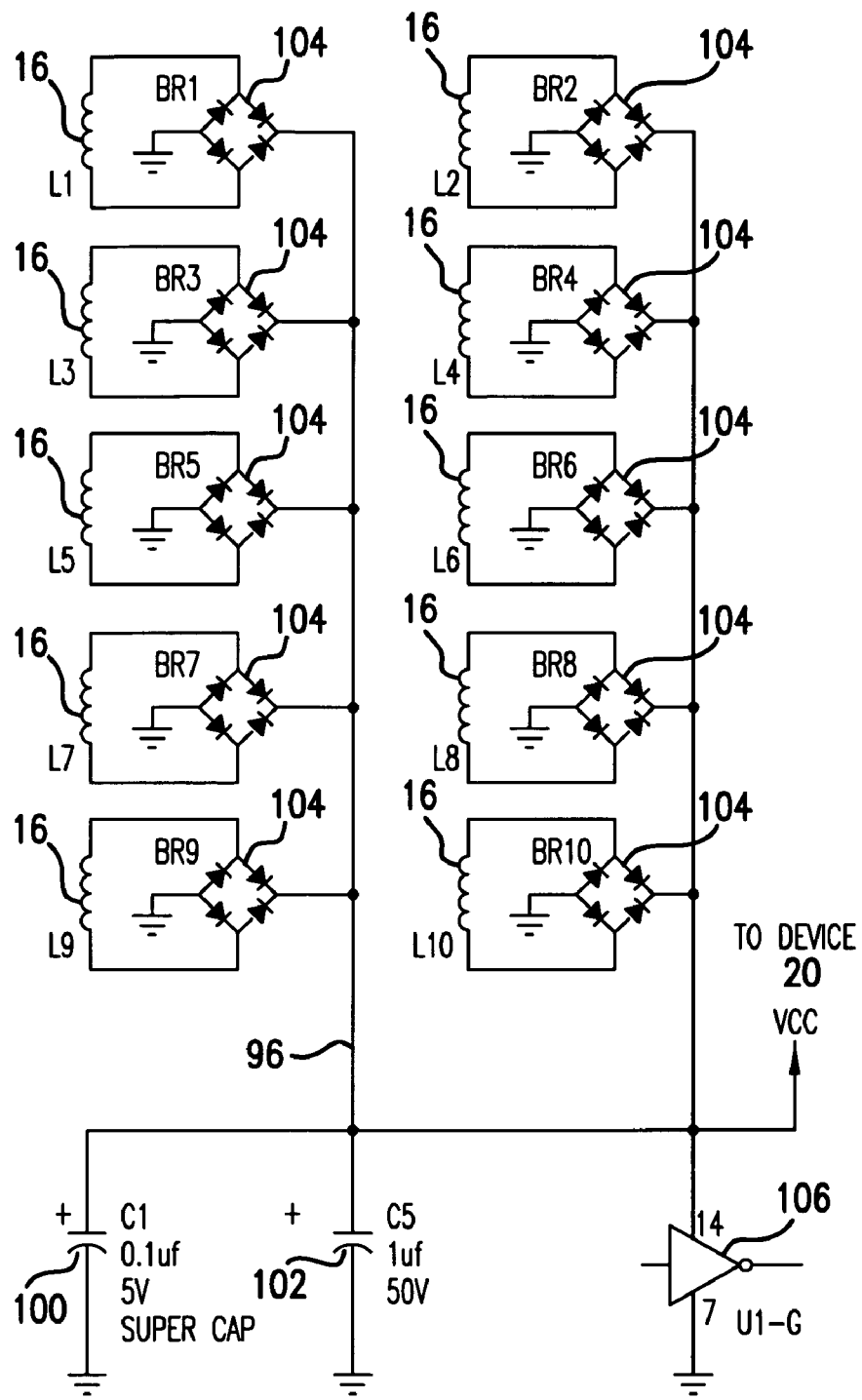
FIG. 7 is a schematic diagram of an electrical power generation scheme in accordance with one exemplary embodiment.
Figure 8:
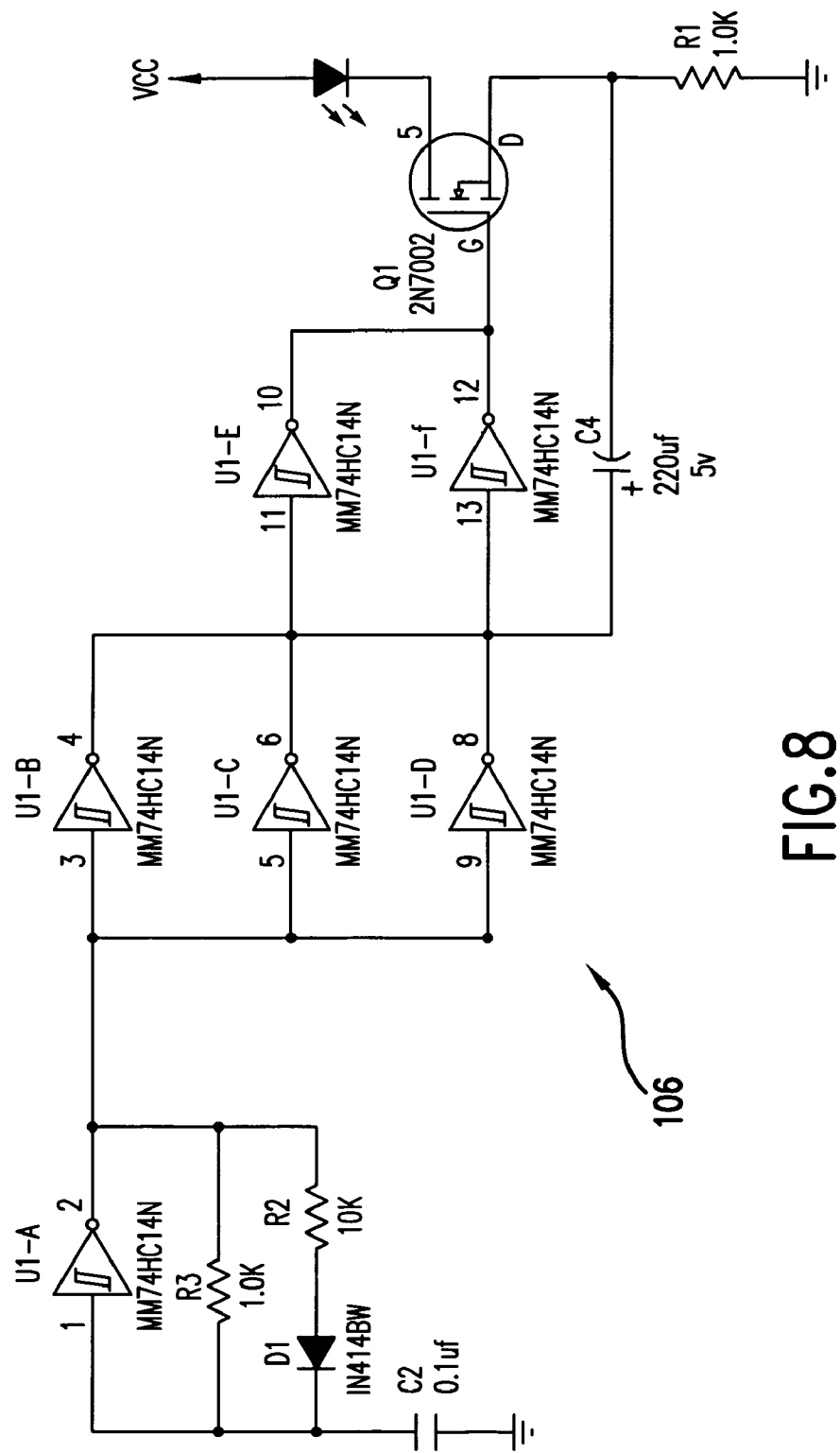
FIG. 8 is a schematic diagram of a hex inverting Schmitt trigger of FIG. 7.

FIGS. 7 and 8 illustrate the electrical circuitry of the energy harvester 10 in accordance with one exemplary embodiment. As shown, the energy harvester 10 includes ten coils 16 through which an alternating current impulse is generated upon passage of the coils 16 through the magnetic field generated by the permanent magnets 12 and 14. Each of the coils 16 is associated with a rectifier bridge 104 that functions to convert the alternating current impulse into direct current so that the sinusoidal outputs of the coils 16 do not cancel each other out upon being combined. A supercapacitor 100 is included in the circuit and is charged in order to provide power to the device 20 when the energy harvester 10 is at rest and not currently generating power. Capacitor 102 is provided and is used to filter noise from the signal that is sent to a hex inverting Schmitt trigger 106 that functions to convert the input wave into a square wave that is then subsequently output to the device 20. FIG. 8 shows the configuration of the hex inverting Schmitt trigger 106 in accordance with one exemplary embodiment.

Figure 9:
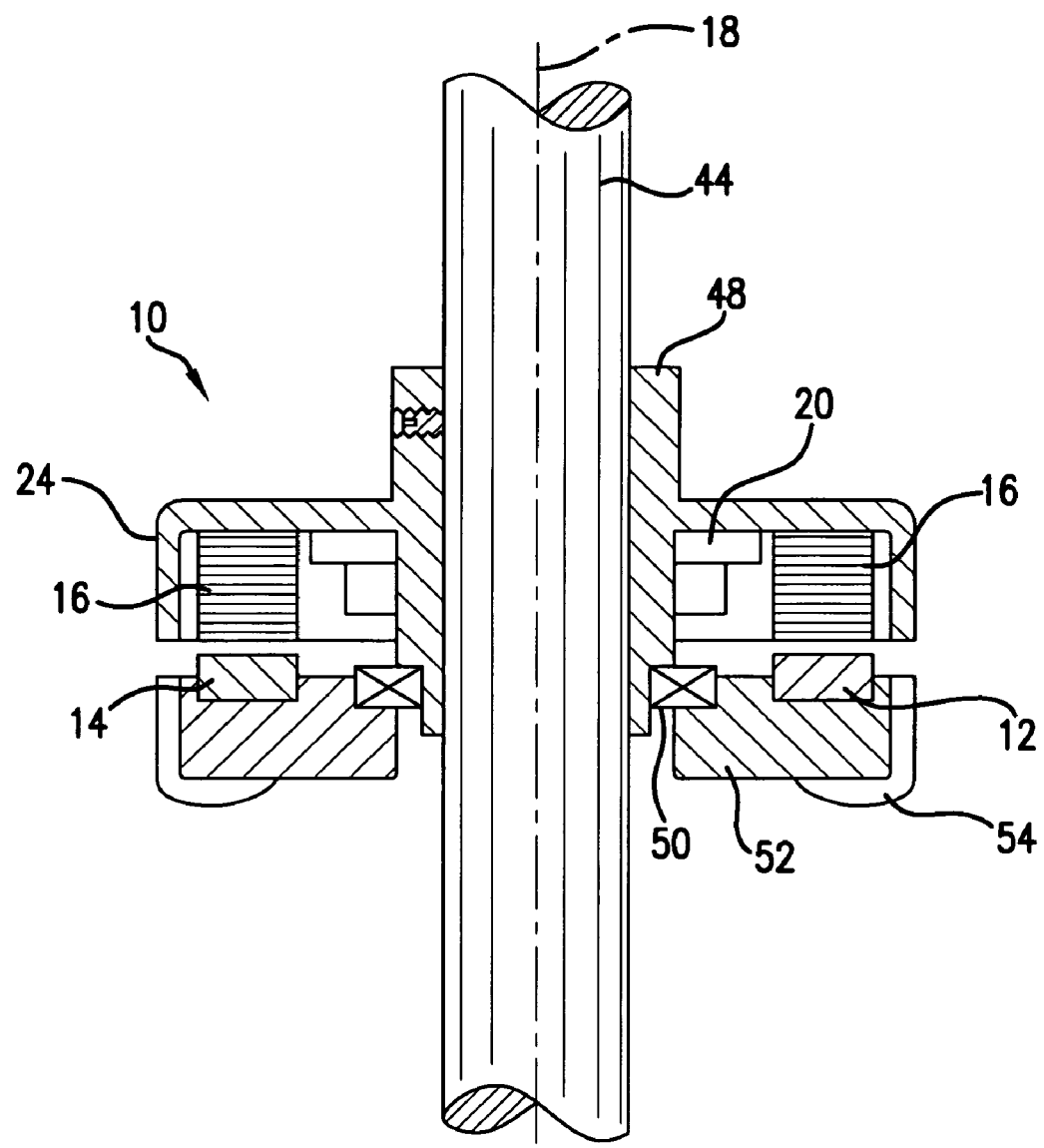
FIG. 9 is a cross-sectional view of an energy harvester configured as a vibration monitor in accordance with another exemplary embodiment.

FIG. 9 discloses another exemplary embodiment of the energy harvester 10 that is used for measuring the vibration of a shaft 44. The energy harvester 10 may be mounted directly onto the shaft 44 that is rotating and whose vibration is desired to be measured. In other arrangements, the energy harvester 10 may be indirectly mounted to the shaft 44 such as through a bearing or other element. The housing 24 includes a rotor 48 that directly contacts the shaft 44 and is attached thereto so that the relative position between the rotor 48 and the shaft 44 does not change as these elements rotate. The rotor 48 carries a device 20 that can include an electronics package and an accelerometer. Vibration generated by the shaft 44 can be detected by the device 20 and may be stored for later retrieval or can be transmitted from the device 20 to another instrument by way of radio frequency capability of the device 20. The rotor 48 also includes one or more coils 16.

A bearing 50 is attached to the rotor 48 on its inner race and is attached to a rotating element 52 on its outer race. The bearing 50 features enough resistance such that rotation of the rotor 48 causes both the inner and outer races of the bearing 50 to rotate so that this rotation is translated to the rotating element 52. As such, the rotating element 52 may be connected to the rotor 48 solely through the bearing 50 such that the rotating element 52 contacts only the bearing 50 and no other element of the energy harvester 10 such as the rotor 48. The rotating element 52 may include one or more permanent magnets 12 and 14. Rotation of shaft 44 and attached rotor 48 may be at an rpm faster than that of the rotating element 52 due to the resistance imparted by the bearing 50. In other arrangements, one or more turbine fins 54 can be present on the rotating element 52 to provide resistance to turning of the rotating element 52 to thus slow the rotating element 52 such that it functions to increase the relative motion between the coils 16 and the permanent magnets 12 and 14. This relative motion creates electrical energy that can be input into the device 20 in order to power the vibration sensor as required. Although shown as being associated with the rotor 48, the coils 16 may be located on the rotating element 52, and the permanent magnets 12 and 14 may be carried by the rotor 48.

The axis 18 about which the rotor 48 and the rotating element 52 rotate is coaxial with the axis of the shaft 44. The axis 18 can be oriented vertically, horizontally, or at any degree relative to the ground 36. The various components of the energy harvester 10 described in FIG. 9 can be arranged or modified in manners similar to those of previously discussed embodiments and a repeat of this information is not necessary. The embodiment in FIG. 9 of the energy harvester 10 is varied from previous embodiments in that both the coils 16 and the permanent magnets 12 and 14 rotate a complete 360° about the axis 18 during essentially the entire rotation of the shaft 44. Any amount of rotational difference between the rotor 48 and the rotating element 52 can be present in accordance with various exemplary embodiments. The energy harvester 10 thus captures energy generated through rotation of the shaft 44 for its functioning which would otherwise be wasted.

Figure 10:
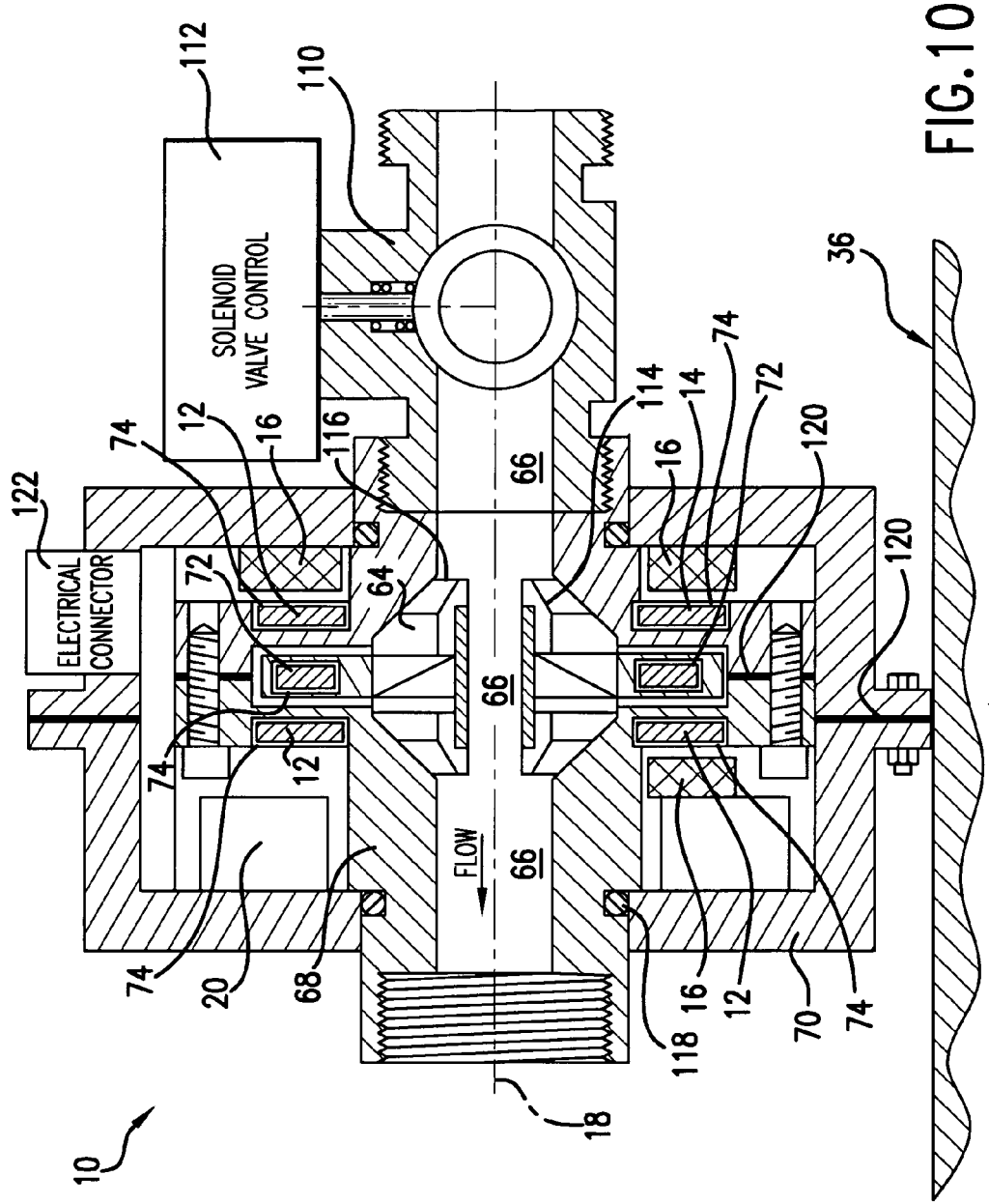
FIG. 10 is a cross-sectional view of an energy harvester incorporated into an irrigation system in accordance with another exemplary embodiment.

Another exemplary embodiment of the energy harvester 10 is shown in FIG. 10 incorporated into an irrigation system. The device 20 may be a moisture sensor and timer that is powered by the energy harvester 10. The device 20 may be capable of detecting when the ground 36 has been provided with a sufficient amount of moisture or is in need of watering. Further, the device 20 may additionally include a timer that is used to regulate the watering process. A microprocessor can be included in the device 20 so that the device 20 functions to turn on and off the irrigation system based upon measured readings, timing, commands from a remote location, or any combination thereof. When the device orders the irrigation system on, a signal may be sent to a solenoid valve control 112 that in turn actuates a solenoid valve 110 to turn the irrigation system on or off. The solenoid valve control 112 may be a component of the device 20 or may be a separate component that is controlled and/or powered by the device 20.

Water 66 in the irrigation system may flow through the solenoid valve 110 when opened and through a central aperture of a turbine wheel 64. A housing 24 can surround the turbine wheel 64. The housing 24 may include a two piece wet housing assembly 68 that is bolted together and defines a pathway for the flow of water 66 therethrough such that the water 66 contacts the wet housing assembly 68. The two piece wet housing assembly 68 surrounds the turbine wheel 64. One or more turbine wheel bearing support fins 116 engage the interior of the two piece wet housing assembly 68. A turbine wheel bearing 114 is supported by the turbine wheel bearing support fins 116 and function to allow the turbine wheel 64 to rotate about the axis 18. One or more transmission magnets 72 can be attached to the turbine wheel 64 and can rotate therewith so that the relative position between these components does not change. Any number of transmission magnets 72 may be present in accordance with various exemplary embodiments.

The turbine wheel 64 is turned by water 66 flowing through the irrigation system and takes energy out of this flowing water to drive the energy harvester 10. The vast majority of the water 66 flows through the central aperture of the turbine wheel 64 that is aligned with the axis 18. Some of the water 66 is diverted radially along the turbine wheel 64 to contact the blades of the turbine wheel 64 that are positioned radially around the turbine wheel 64. Contact of the water 66 with the blades causes the turbine wheel 64 to be driven in the radial direction. The turbine wheel bearing 114 functions as a radial bearing and a thrust bearing to accommodate the forces imparted upon the turbine wheel 64 through impact with the water 66. The diverted water 66 will flow through apertures associated with the turbine blades and thus exit on the other side of the turbine wheel 64 to mix with the water 66 that flows through the central aperture of the turbine wheel 64.

The housing 24 may also include a dry housing assembly 70 that like the wet housing assembly 68 may be made of two pieces and bolted together. The dry housing assembly 70 can be arranged so that water 66 flowing through the energy harvester 10 does not contact the dry housing assembly 70. The device 20 can be located within the housing 24 and in certain embodiments may be located between the wet housing assembly 68 and the dry housing assembly 70. A raceway 74 may also be located within a cavity defined between the assemblies 68 and 70, although in other arrangements this need not be the case. The raceway 74 can extend 360° about the axis 18. The raceway 74 may be formed completely by the wet housing assembly 68, completely by the dry housing assembly 70, or by a combination of these two assemblies 68 and 70. In other embodiments, a separate component can be located within the housing 24 to form the raceway 74. The raceway 74 may be encapsulated within the housing 24. The raceway 74 may feature curved surfaces such that its inner radial surface may be convex in shape and its outer radial surface may be concave in shape. One or more permanent magnets 12 and 14 can be located within the raceway 74. As previously discussed, any number of permanent magnets 12 can be used. For example, from 1-20 permanent magnets 12 can be employed in various embodiments of the energy harvester 10.

One or more coils 16 can be located within the housing 24. The coils 16 may be located within the space defined between the wet housing assembly 68 and the dry housing assembly 70. The coils 16 can be fixedly attached to the housing 24 so that the coils 16 do move with respect to the housing 24. As such, the coils 16 do not rotate about the axis 18. Movement of the permanent magnets 12 and 14 through the raceway 74 and thus completely around the axis 18 induces an electrical current in the coils 16 in a manner as previously discussed. This electrical energy is then transferred to a battery or the device 20 in order to power same in a manner as previously discussed. The transmission magnet 72 is thus in magnetic communication with the permanent magnets 12 and 14 so that these magnets all rotate about the axis 18 at the same rate. The transmission magnets 72 function to transmit rotation of the turbine wheel 64 to the permanent magnets 12 and 14. This arrangement may be done in order to more closely position the permanent magnets 12 and 14 to the coils 16 during relative motion so that a stronger electrical current can be generated. However, it is to be understood that other embodiments are possible in which the transmission magnets 72 are not present. In these arrangements, the permanent magnets 12 and 14 are attached directly to the turbine wheel 64 and move past the coils 16 to generate an electrical impulse in the coils 16.

The energy harvester 10 can include various o-ring seals 118 between the wet housing assembly 68 and the solenoid valve 110 or other portions of the irrigation system in communication with water 66 flowing through the energy harvester 10. The o-ring seals may function to prevent water 66 from flowing into the interior of the housing 24 and damaging electrical components therein. Further, one or more gasket seals 120 can be located between the two pieces forming the wet housing assembly 68 and between the two pieces forming the dry housing assembly 70. It is to be understood that other arrangements are possible in which the housing 24 is variously configured and does not include a wet housing assembly 68 formed of two pieces connected to one another and/or a dry housing assembly 70 formed of two pieces connected to one another. The gasket seals 120 may further function to seal or prevent water 66 from propagating to certain sections of the energy harvester 10. An external electrical connector 122 may be carried by the housing 24 should the power generated by the energy harvester 10 be desired to be used to drive a device 20 outside of the energy harvester 10.

Figure 11:
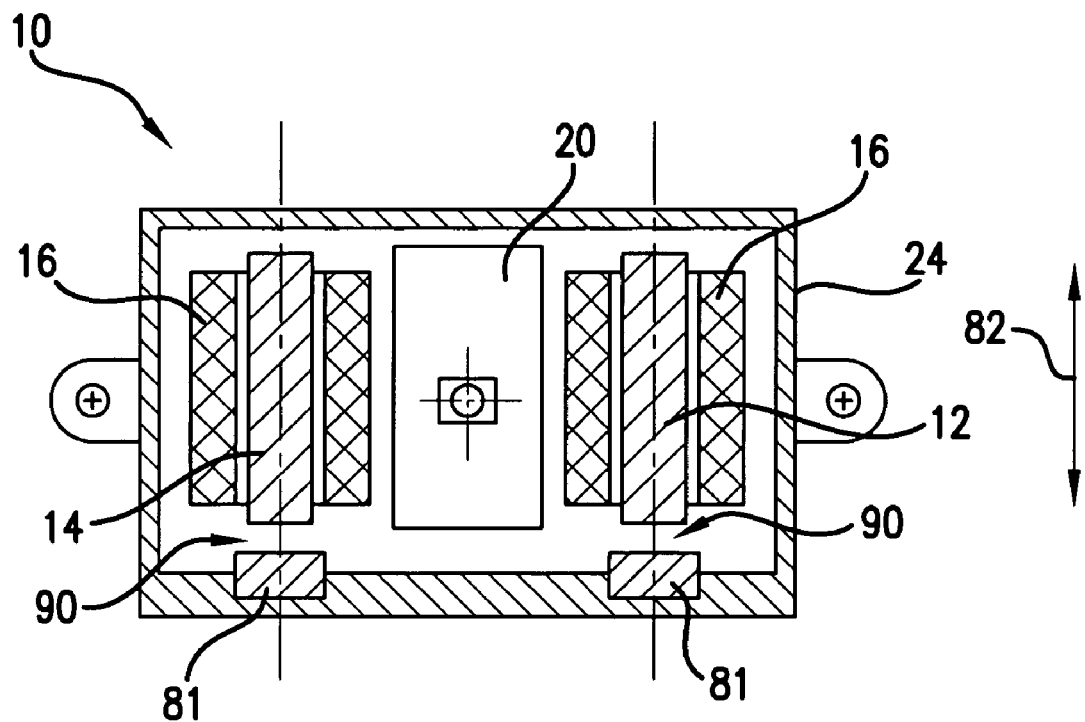
FIG. 11 is a front cross-sectional view of an energy harvester incorporated into a lighting device for an object in accordance with another exemplary embodiment.
Figure 12:
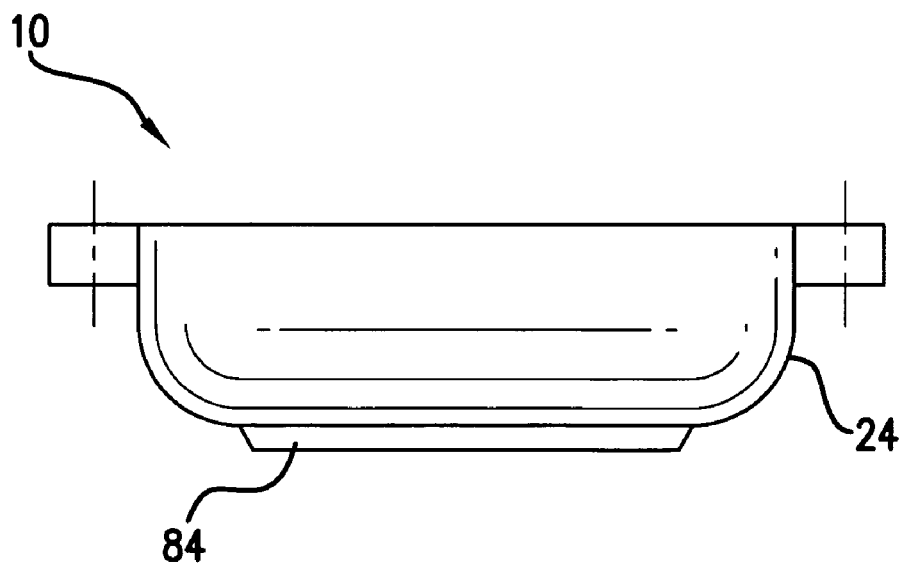
FIG. 12 is a top view of the energy harvester of FIG. 11.
Figure 13:
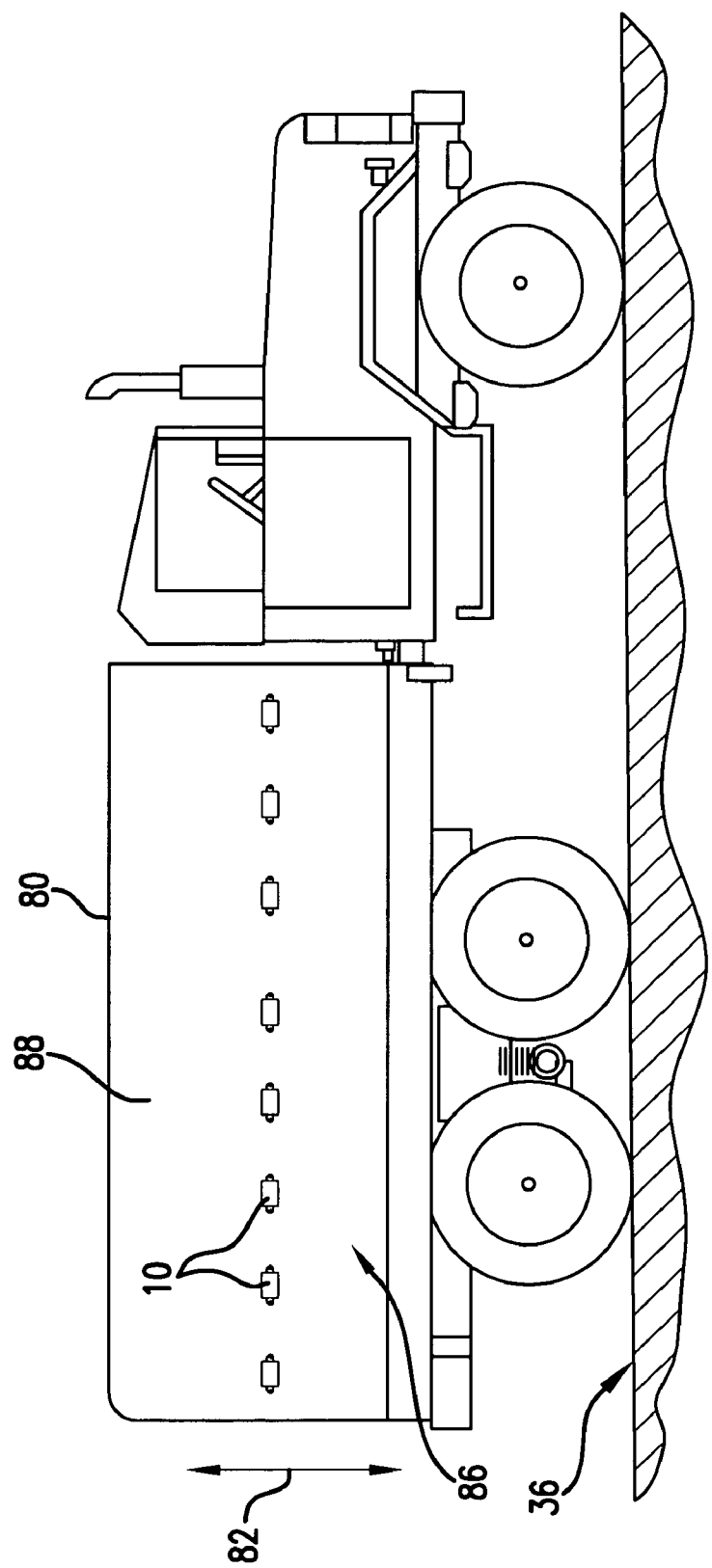
FIG. 13 is a side view of multiple energy harvesters of FIG. 11 incorporated into an object that is a trailer of a tractor trailer truck.

FIGS. 11-13 disclose another exemplary embodiment of the energy harvester 10. The energy harvester 10 may be used to provide energy to a device 20 that can be one or more light emitting diodes used to provide illumination. The energy harvester 10 may generate electricity through relative motion between coil 16 and permanent magnet 12. The coil 16 and permanent magnet 12 can be located within a housing 24. The housing 24 may be attached to an object 80 that moves relative to the ground 36. Object 80 may be a vehicle such as a rail car or trailer of a tractor trailer truck. As illustrated, the object 80 is a trailer 88 of a tractor trailer truck. The energy harvester 10 thus functions to provide illumination to the trailer 88 to increase visibility of the trailer 88 at night. However, it is to be understood that the object 80 need not be a trailer 88 in other arrangements and can be any type of vehicle or device capable of moving with respect to the ground 36. The energy harvester 10 may be attached to a vertical surface 86 of the trailer 88. The housing 24 may be attached to the vertical surface 86 to effect this connection. However, in other embodiments, the energy harvester 10 need not be attached to a vertical surface 86 but instead can be attached to a horizontal surface of the object 80 or to a surface that is disposed at an angle to the ground 36.

The energy harvester 10 can include a repulsing magnet 81 that is rigidly affixed to the housing 24 so that the relative position of the repulsing magnet 81 to the housing 24 does not change. The repulsing magnet 81 can be located at the bottom of the housing 24 so as to be located on a portion of the housing 24 that is closer to the ground 36 than the interior of the housing 24 defined by the walls of the housing 24. The permanent magnet 12 can be located above the repulsing magnet 81 in the vertical direction 82 and can be arranged with respect to the repulsing magnet 81 so that their polarities are oriented so as to repulse one another. In this regard, an empty space 90 can be present between the permanent magnet 12 and the repulsing magnet 81. Although not shown, a plastic sleeve may be located around the permanent magnet 81 so as to help confine the movement of the permanent magnet 81 to prevent same from moving laterally with respect to the repulsing magnet 81. The weight of the permanent magnet 12 is balanced by the repulsing force of magnet 81 so that the permanent magnet 12 floats in the housing 24. Movement of the object 80 creates vibration forces that are transferred to the entire energy harvester 10. These vibration forces can be generated by simply traveling along a highway or other road surface as up and down forces will always be present in vehicles traveling along the road to some degree to thus cause the permanent magnet 12 to move in the vertical direction 82. Wind resistance may also impart forces onto the energy harvester 10 to cause vibrations thereon that may cause the permanent magnet 12 to vibrate. Vibrations imparted onto the energy harvester 10 cause the permanent magnet 12 to move up and down in the vertical direction 82. As the permanent magnet 12 is constrained from moving in the lateral direction, its movement will be vertically up and down with respect to the coil 16 that surrounds the permanent magnet 12.

Relative movement between the permanent magnet 12 and the coil 16 will cause electrical energy to be generated that will thus be used to power the device 20. The device 20 can include a light emitting diode that is illuminated by the power generated. The housing 24 may include a lens 84 that functions to diffuse the light emitted by the light emitting diode so that a desired illumination is generated. The device 20 will thus function as a side marker light for the trailer 88 to increase visibility of the trailer 88. The area above the permanent magnet 12 can include rubber in order to absorb force imparted by the permanent magnet 12 upon hitting the upper portion of the housing 24 if the permanent magnet 12 is subjected to forces sufficient to move it against this location. In other exemplary embodiments, a second repulsing magnet may be located above the permanent magnet 12 in the vertical direction 82 in order to confine or limit movement of the permanent magnet 12 in the vertical direction 82.

A second permanent magnet 14 can be included and may be disclosed within a second coil 16 and repulsed by an additional repulsing magnet 81 to effect generation of electrical current in a similar manner as permanent magnet 12. The presence of the second arrangement increases the amount of power generated by the energy harvester 10. Any number of additional coils 16 and permanent magnets 12 can be employed in other exemplary embodiments to generate a desired amount of power for the device 20. Again, although described as being located within the housing 24, the device 20 can be outside of the housing 20 in other embodiments. The energy harvester 10 can be used to power a device 20 initially provided by the manufacturer of the object 80, or can be used to power an add-on piece of equipment subsequently added to the object 80. Also, the device 20 can be used to perform other functions in addition to or alternatively to the generation of light. FIG. 13 illustrates a number of energy harvesters 10 located on the vertical surface 86 of the trailer 88 for use in illuminating the trailer 88 during night time driving.

Figure 14:
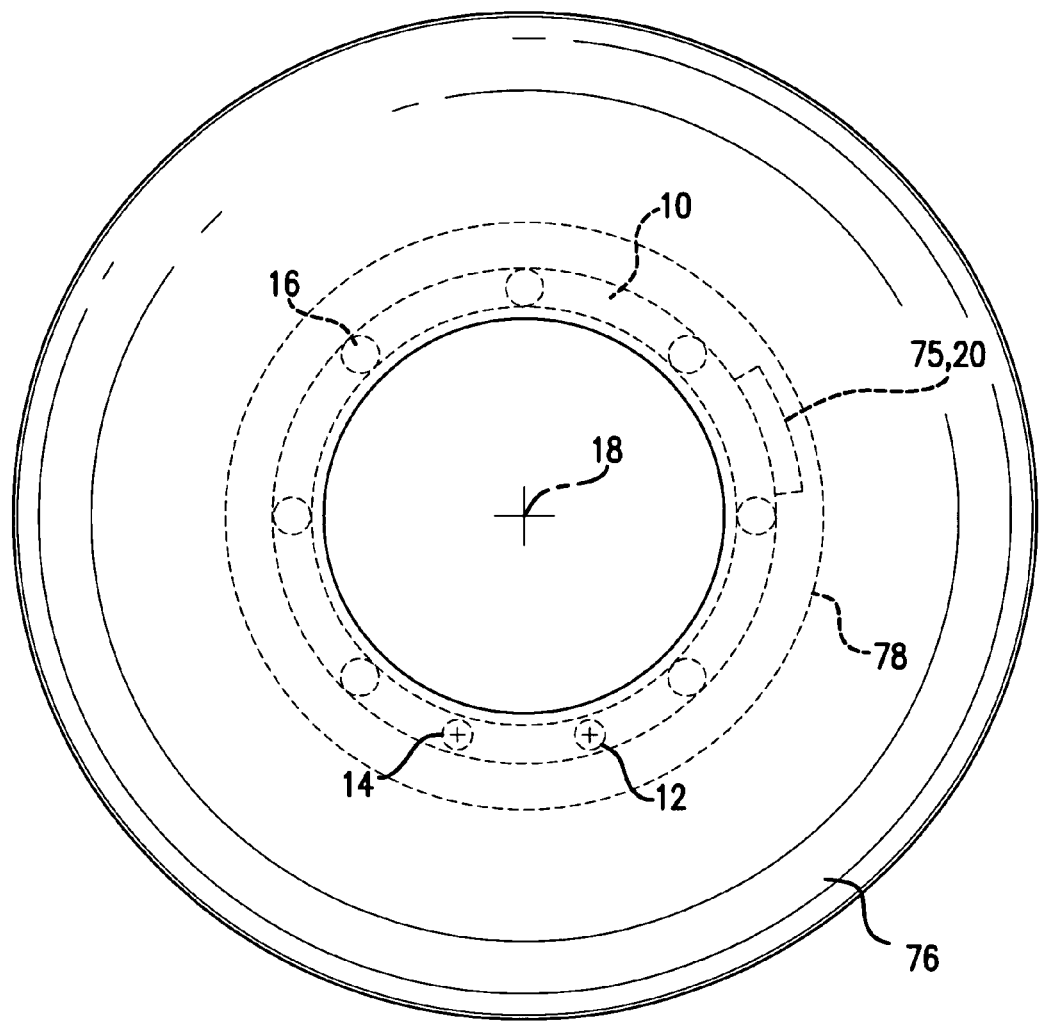
FIG. 14 is a front cross-sectional view of an energy harvester incorporated into a pressure monitoring system of a tire in accordance with another exemplary embodiment.

Another application for the energy harvester 10 is disclosed with reference to FIG. 14. Here, the energy harvester 10 is incorporated into a pressure monitoring system 75 of a vehicle tire 76 that could be used in an automobile, truck, or other vehicle. The pressure monitoring system 75 is used to monitor the amount of pressure within the vehicle tire 76 that is the air pressure within the space between the vehicle tire 76 and the rim 78 onto which the vehicle tire 76 is seated. The pressure monitoring system 75 senses this air pressure and communicates same via radio frequency or other means to a computer system of the vehicle that will alert the driver should the vehicle tire 76 pressure become low. A battery may be incorporated into the pressure monitoring system 75 to provide the power necessary to run same. The energy harvester 10 can be present in order to either charge a battery that in turn powers the pressure monitoring system 75, or may be present to directly power the pressure monitoring system 75. The energy harvester 10 may generate from 3-5 volts in certain exemplary embodiments to power the pressure monitoring system 75. The energy harvester 10 is mounted so that its axis 18 is coaxial with the axis of rotation of the rim 78. The energy harvester 10 can be arranged in a manner similar to that previously discussed with respect to the bicycle application in FIGS. 1-6 and a repeat of this information is not necessary. However, instead of powering one or more light emitting diodes as the device 20, the device 20 in the present exemplary embodiment is the pressure monitoring system 75. Rotation of the rim 78 during movement of the vehicle causes the energy harvester 10 to generate power in the described manner that in turn provides power to the pressure monitoring system 75. The energy harvester 10 may charge a battery of the pressure monitoring system 75 or may store energy in a capacitor or battery of the energy harvester 10 so that the pressure monitoring system 75 can be powered during times in which the vehicle is not moving and the rim 78 is not turning. Although described as measuring pressure, it is to be understood that the pressure monitoring system 75 may monitor temperature, vehicle identification, tread depth, mileage, and/or date or time of usage in accordance with other exemplary embodiments. The energy harvester 10 allows one to power the pressure monitoring system 75 until the life of the vehicle tire 76 has been exhausted thus eliminating any need to perform specific servicing of the pressure monitoring system 75 should a conventional battery to power the system 75 be used and die.

The various embodiments of the energy harvester 10 may include a capacitor or battery that is used to store the generated electrical energy produced. Alternatively, the energy harvester 10 may not include an energy storage device but may instead be affiliated with a device 20 that is only powered when the energy harvester 10 is moving or otherwise generating electricity. The device 20 may be a component of the energy harvester 10 in certain arrangements and may include a capacitor that allows the generated energy to be stored so that the device 20 can function when energy is not being generated. The device 20 may include a microprocessor that can manage and regulate the energy associated with the electronic circuitry that can likewise sense, monitor or count the rotation of the energy harvester 10.

The previously described embodiments can be altered in other exemplary embodiments of the energy harvester 10. For example, the positions of the coil 16 and the permanent magnet 12 can be substituted for one another. Changing the positions of these components will still provide for the generation of electrical current because there will still be relative movement between the permanent magnet 12 and the coil 16. As such, in additional exemplary embodiments the positions of the permanent magnets 12 and 14 and the coils 16 can be reversed with one another from that disclosed in all of the previously described exemplary embodiments. Further, it is to be understood that the disclosed methods of driving the energy harvester 10 are only exemplary and that others are possible. For example, the energy harvester 10 may be used as a wind generator and can be driven by wind. The energy harvester 10 may be incorporated into any type of turbine that is driven by wind, water, or other fluid for use in generating electricity. Also, the energy harvester 10 can be incorporated into numerous applications besides those mentioned herein that serve to demonstrate various exemplary embodiments of the energy harvester 10. For example, the energy harvester 10 may be incorporated into a drive shaft or a helicopter shaft for use in supplying power to a vibration monitoring device 20.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

What is claimed:

1. An energy harvester, comprising:
   a permanent magnet;
   a coil;
   wherein one of the permanent magnet and coil rotate completely about an axis such that relative movement between the permanent magnet and the coil is realized to generate an electrical current for use in powering a device; and
   a housing that rotates completely about the axis, wherein the housing defines a channel that rotates completely about the axis, wherein a convex outer surface engages a concave inner surface of the channel and rotates relative to the concave inner surface about a different axis of rotation than that of the concave inner surface to cause the other one of the permanent magnet and the coil to not rotate completely about the axis.

2. The energy harvester as set forth in claim 1, wherein the coil rotates completely about the axis and wherein the permanent magnet does not rotate completely about the axis, wherein gravity holds the permanent magnet at a bottom location of the energy harvester.

3. The energy harvester as set forth in claim 2,
   wherein the coil is attached to the housing such that the coil does not move with respect to the housing, wherein the permanent magnet has the convex outer surface that rides in the channel and engages the concave inner surface of the channel such that the permanent magnet and the housing move relative to one another, wherein the permanent magnet is located at a bottom surface of the channel during rotation of the housing about the axis due to the convex outer surface of the permanent magnet and gravity.

4. The energy harvester as set forth in claim 2, wherein the coil is located in the housing and attached to the housing such that the coil does not move with respect to the housing; and further comprising
   a carriage that carries the permanent magnet, wherein the carriage is located outside of the outside of the housing so that the housing and carriage move relative to one another when the housing rotates, wherein the carriage is located at the bottom of the energy harvester as the housing rotates about the axis, wherein the carriage has a roller that has the convex outer surface that rides in the channel and engages the concave inner surface of the channel.

5. The energy harvester as set forth in claim 1, wherein the device is a pressure monitoring system for a tire, and wherein the permanent magnet and the coil are located inside of a tire of a vehicle, and wherein the axis is coaxial with the axis of rotation of the tire.

6. An energy harvester, comprising:
   a permanent magnet;
   a coil;
   wherein at least one of the permanent magnet and coil rotate completely about an axis such that relative movement between the permanent magnet and the coil is realized to generate an electrical current for use in powering a device;
   wherein the coil rotates completely about the axis and wherein the permanent magnet does not rotate completely about the axis, wherein gravity holds the permanent magnet at a bottom location of the enemy harvester; and
   a housing, wherein the housing rotates completely about the axis and wherein the coil is attached to the housing such that the coil does not move with respect to the housing, wherein the housing defines a channel into which the permanent magnet is located, wherein the permanent magnet has a curved outer surface and rides in the channel such that the permanent magnet and the housing move relative to one another, wherein the permanent magnet is located at a bottom surface of the channel during rotation of the housing about the axis due to the curved outer surface of the permanent magnet and gravity;
   wherein a plurality of coils are present and are all attached to the housing such that the coils do not move with respect to the housing, wherein two permanent magnets are present and are disc shaped and ride in the channel next to one another, wherein the two permanent magnets are arranged so as to repel one another such that an empty space is located between the two permanent magnets, and wherein the device is a light that is powered by the generated electrical current, and wherein the housing is attached to a wheel of a bicycle such that the axis is oriented horizontally with respect to the ground.

7. An energy harvester, comprising:
   a permanent magnet;
   a coil;
   wherein at least one of the permanent magnet and coil rotate completely about an axis such that relative movement between the permanent magnet and the coil is realized to generate an electrical current for use in powering a device;
a shaft that rotates about the axis;
a rotor that is rigidly attached to the shaft, wherein one of the coil and the permanent magnet is rigidly attached to the rotor and does not move relative to the rotor;
a bearing; and
a rotating element that engages the bearing, wherein the other one of the coil and the permanent magnet is rigidly attached to the rotating element and does not move relative to the rotating element;
wherein both the permanent magnet and the coil rotate in the same direction about the axis, wherein the rates of rotation of the permanent magnet and the coil are different such that relative movement between the permanent magnet and the coil is realized;
wherein the shaft rotates about the axis such that this rotation drives rotation of the bearing that is communicated to the rotating element to in turn drive rotation of the rotating element.

8. The energy harvester as set forth in claim 7, wherein the bearing is attached to the rotor.

9. The energy harvester as set forth in claim 8, wherein:
a plurality of coils and permanent magnets are present;
wherein the coils are all attached to the rotor such that the coils do not move relative to the rotor;
wherein the rotating element is attached to the permanent magnets; and
further comprising a fin attached to the rotating element and that functions to slow the rotating element such that the rotating element rotates about the axis at a slower rate than the rotor to effect the different rate of rotation of the permanent magnets and the coils, and wherein the device powered by the generated electrical current is used to measure vibration in the shaft.

10. An enemy harvester, comprising:
a permanent magnet;
a coil;
wherein at least one of the permanent magnet and coil rotate completely about an axis such that relative movement between the permanent magnet and the coil is realized to generate an electrical current for use in powering a device;
a housing at a fixed location relative to the ground, wherein one of the coil and the permanent magnet is attached to the housing so as to have a fixed location relative to the ground; and
a turbine wheel that rotates about the axis and effects rotation of the other one of the coil and the permanent magnet such that the relative movement between the permanent magnet and the coil is realized, wherein the turbine wheel has a central aperture through which the axis extends, wherein the turbine wheel has a plurality of blades, wherein water flows through the central aperture, wherein some of the water engages the blades and this engagement causes the rotational movement of the turbine wheel about the axis.

11. The energy harvester as set forth in claim 10, wherein the housing is made of a two piece wet housing assembly that is contacted by the water that rotates the turbine wheel during operation of the energy harvester, and wherein the housing is made of a two piece dry housing assembly that is not contacted by the water that rotates the turbine wheel during operation of the energy harvester.

12. The energy harvester as set forth in claim 10, wherein the coil is attached to the housing so as to have a fixed location relative to the ground, wherein the permanent magnet is attached to the turbine wheel so as to have a fixed location relative to the turbine wheel.

13. An enemy harvester, comprising:
a permanent magnet;
a coil;
wherein at least one of the permanent magnet and coil rotate completely about an axis such that relative movement between the permanent magnet and the coil is realized to generate an electrical current for use in powering a device;
a housing at a fixed location relative to the ground, wherein one of the coil and the permanent magnet is attached to the housing so as to have a fixed location relative to the ground; and
a turbine wheel that rotates about the axis and effects rotation of the other one of the coil and the permanent magnet such that the relative movement between the permanent magnet and the coil is realized;
wherein the coil is attached to the housing so as to have a fixed location relative to the ground, and further comprising a transmission magnet attached to the turbine wheel so as to have a fixed location relative to the turbine wheel, and wherein the permanent magnet is located in a raceway that is at least partially located within the housing, wherein rotation of the transmission magnet effects rotation of the permanent magnet through the raceway so as to effect relative movement between the permanent magnet and the coil.

14. The energy harvester as set forth in claim 13, wherein water is used to rotate the turbine wheel, and wherein the device effects the turning on and turning off of an irrigation system.

15. An energy harvester, comprising:
a housing configured for rotating about an axis, wherein the housing defines a channel therein;
at least two permanent magnets that are both disc shaped, wherein the two permanent magnets are located in the channel of the housing and are surrounded by the housing, wherein the two permanent magnets are arranged with respect to one another such that the polarity of the two permanent magnets causes the two permanent magnets to repel one another such that an empty space is present between the two permanent magnets, wherein the axis is oriented horizontally with respect to the ground such that rotation of the housing causes the channel to be moved relative to the two permanent magnets such that the two permanent magnets ride along the channel and are located at the bottom of the energy harvester; and
a plurality of coils attached to the housing such that the relative location between the coils and the housing is fixed, wherein relative movement between the permanent magnets and the coils is realized to generate an electrical current for use in powering a device.

16. An energy harvester, comprising:
a housing attached to an object capable of moving with respect to the ground;
a repulsing magnet carried by the housing;
a permanent magnet that is repulsed by the repulsing magnet; and
a coil located proximate to the permanent magnet, wherein movement of the object causes vibrations to be imparted onto the permanent magnet so as to cause the permanent magnet to move vertically with respect to the coil, wherein relative movement between the permanent magnet and the coil generates an electrical current for use in powering a device.

17. The energy harvester as set forth in claim 16, wherein the housing has a lens and wherein the repulsing magnet and coil are attached to the housing such that the positions of the repulsing magnet and the coil are fixed with respect to the housing, wherein the device is a light emitting diode that is illuminated by electrical current generated through relative movement between the permanent magnet and the coil.

18. The energy harvester as set forth in claim 16, wherein the housing is attached to a vertical surface of the object, and wherein the repulsing magnet is located below the permanent magnet, and wherein an empty space is located between the repulsing magnet and the permanent magnet.

19. The energy harvester as set forth in claim 16, wherein the object is a trailer of a truck.

* * * * *